(12) United States Patent
McCorkendale et al.

(10) Patent No.: US 9,781,151 B1
(45) Date of Patent: Oct. 3, 2017

(54) TECHNIQUES FOR IDENTIFYING MALICIOUS DOWNLOADABLE APPLICATIONS

(75) Inventors: Bruce E. McCorkendale, Manhattan Beach, CA (US); Sourabh Satish, Fremont, CA (US); Xuefeng Tian, Beijing (CN); Jingnan Si, Beijing (CN); Jun Mao, Beijing (CN); Xiaole Zhu, Beijing (CN); Sheng Gong, Beijing (CN)

(73) Assignee: Symantec Corporation, Mountain View, CA (US)

( * ) Notice: Subject to any disclaimer, the term of this patent is extended or adjusted under 35 U.S.C. 154(b) by 372 days.

(21) Appl. No.: 13/271,104

(22) Filed: Oct. 11, 2011

(51) Int. Cl.
G06F 11/00 (2006.01)
G08B 23/00 (2006.01)
H04L 29/06 (2006.01)

(52) U.S. Cl.
CPC ...... *H04L 63/1441* (2013.01); *H04L 63/1416* (2013.01)

(58) Field of Classification Search
CPC . G06F 21/564; G06F 21/552; H04L 53/1416; H04L 63/1416; H04L 63/1408; H04L 63/1441; H04L 63/1458; H04W 4/00
USPC ............ 726/1, 13, 22–33, 206, 249, 389; 713/153–154, 187–188, 193–194; 709/206, 249, 389, 1, 13, 22–33
See application file for complete search history.

(56) References Cited

U.S. PATENT DOCUMENTS

| 8,001,606 | B1* | 8/2011 | Spertus | G06F 21/564 709/203 |
| 8,220,054 | B1* | 7/2012 | Lu | G06F 21/566 709/224 |
| 8,370,938 | B1* | 2/2013 | Daswani | G06F 21/562 726/23 |
| 2007/0240217 | A1* | 10/2007 | Tuvell et al. | 726/24 |
| 2010/0192222 | A1* | 7/2010 | Stokes | G06F 21/563 726/22 |

(Continued)

OTHER PUBLICATIONS

Teufl et al., "Android Market Analysis with Activation Patterns," Security and Privacy in Mobile Information and Communication Systems, Lecture Notes of the Institute for Computer Sciences, Social Informatics and Telecommunications Engineering, 2012, vol. 94, Part 1, 1-12.

(Continued)

*Primary Examiner* — Evans Desrosiers
(74) *Attorney, Agent, or Firm* — Wilmer Cutler Pickering Hale and Dorr LLP (57) ABSTRACT

Techniques for identifying malicious downloadable applications are disclosed. In one particular exemplary embodiment, the techniques may be realized as a method for identifying malicious downloadable applications comprising receiving a signature of a downloadable application, identifying, using at least one computer processor, a known good application having at least one attribute in common with the downloadable application and having a signature different from the signature of the downloadable application, analyzing the downloadable application to evaluate one or more risk factors based at least in part on the at least one common attribute and the difference in signatures, and determining, based on the evaluated one or more risk factors, one or more responsive actions.

19 Claims, 5 Drawing Sheets

(56) References Cited

U.S. PATENT DOCUMENTS

2011/0145920 A1\* 6/2011 Mahaffey et al. .............. 726/22
2011/0162070 A1\* 6/2011 Krasser .................. G06F 21/56
726/23

OTHER PUBLICATIONS

Widera M., "Toward Flow Graph Directed Testing of Functional Programs," Draft Proceedings of the 15th International Workshop on the Implementation of Functional Languages, IFL , 2003, (12 pages).

\* cited by examiner

TECHNIQUES FOR IDENTIFYING MALICIOUS DOWNLOADABLE APPLICATIONS

FIELD OF THE DISCLOSURE

The present disclosure relates generally to network security and, more particularly, to techniques for identifying malicious downloadable applications.

BACKGROUND OF THE DISCLOSURE

Malicious downloadable applications are prevalent. Many malicious downloadable applications may be copies of legitimate applications modified to include malware code. Such trojanized malware applications may contain a same file name, a same package name, and/or functionality similar to the legitimate applications. Conventional malware protection schemes may scan for variants of known malware, but may not detect trojanized variations of legitimate applications.

In view of the foregoing, it may be understood that there may be significant problems and shortcomings associated with current technologies for identifying malicious downloadable applications.

SUMMARY OF THE DISCLOSURE

Techniques for identifying malicious downloadable applications are disclosed. In one particular exemplary embodiment, the techniques may be realized as a method for identifying malicious downloadable applications comprising receiving a signature of a downloadable application, identifying, using at least one computer processor, a known good application having at least one attribute in common with the downloadable application and having a signature different from the signature of the downloadable application, analyzing the downloadable application to evaluate one or more risk factors based at least in part on the at least one common attribute and the difference in signatures, and determining, based on the evaluated one or more risk factors, one or more responsive actions.

In accordance with other aspects of this particular exemplary embodiment, the at least one common attribute may comprise a common package name.

In accordance with further aspects of this particular exemplary embodiment, identifying, using at least one computer processor, a known good application having at least one attribute in common with the downloadable application and having a signature different from the signature of the downloadable application may comprise comparing static features of the downloadable application with static features of the known good application.

In accordance with additional aspects of this particular exemplary embodiment, the techniques may further include determining that a percentage of static features common to the downloadable application and the known good application exceeds a specified threshold.

In accordance with additional aspects of this particular exemplary embodiment, the static features may comprise at least one of: class names, imported resources, exported resources, file names, and file sizes.

In accordance with additional aspects of this particular exemplary embodiment, comparing static features of the downloadable application with static features of the known good application may be performed using locality sensitive hashing.

In accordance with additional aspects of this particular exemplary embodiment, comparing static features of the downloadable application with static features of the known good application may include using functional flow graphs of the static features to determine a percentage of static features common to the downloadable application and the known good application.

In accordance with additional aspects of this particular exemplary embodiment, a known good application may comprise an application registered with a code signing service.

In accordance with additional aspects of this particular exemplary embodiment, the techniques may include identifying a known good application based on at least one of: a known publisher associated with an application, a reputation associated with an application, a release date of an application, a rating of an application, and a number of downloads of an application.

In accordance with additional aspects of this particular exemplary embodiment, analyzing the downloadable application to evaluate one or more risk factors may comprise analyzing the downloadable application to identify functionality associated with malicious behavior.

In accordance with additional aspects of this particular exemplary embodiment, functionality associated with risky behavior may include at least one of: sending SMS messages, accessing a call log, accessing contacts, gaining root access, and installing a backdoor.

In accordance with additional aspects of this particular exemplary embodiment, determining one or more responsive actions may comprise: determining a level of risk based at least in part on a percentage of static features common to the downloadable application and the known good application and the one or more risk factors, and identifying the one or more responsive actions corresponding to the determined level of risk.

In accordance with additional aspects of this particular exemplary embodiment, the techniques may include performing one or more responsive actions.

In accordance with additional aspects of this particular exemplary embodiment, the one or more responsive actions may comprise notifying a publisher associated with the known good application.

In accordance with additional aspects of this particular exemplary embodiment, the one or more responsive actions may comprise at least one of: warning a user, blocking a download of the downloadable application, updating protection on a client device downloading the downloadable application, logging the download, alerting an administrator, and allowing the download.

In accordance with additional aspects of this particular exemplary embodiment, receiving a signature may comprise crawling a website to collect one or more signatures of downloadable applications, receiving a signature from an agent on client device, and receiving a signature from a user of a code signing service.

In accordance with additional aspects of this particular exemplary embodiment, wherein one or more portions of identifying malicious downloadable applications may be performed using at least one of: a client device based security application, a firewall, a gateway, and a network based security application.

In accordance with additional aspects of this particular exemplary embodiment, the techniques may be realized as at least one non-transitory processor readable storage medium storing a computer program of instructions configured to be readable by at least one processor for instructing the at least one processor to execute a computer process for performing the method.

In another particular exemplary embodiment, the techniques may be realized as an article of manufacture for identifying malicious downloadable applications, the article of manufacture comprising at least one non-transitory processor readable storage medium, and instructions stored on the at least one medium. The instructions may be configured to be readable from the at least one medium by at least one processor and thereby cause the at least one processor to operate so as to: receive a signature of a downloadable application, identify a known good application having at least one attribute in common with the downloadable application and having a signature different from the signature of the downloadable application, analyze the downloadable application to evaluate one or more risk factors based at least in part on the at least one common attribute and the difference in signatures, and determine, based on the evaluated one or more risk factors, one or more responsive actions.

In yet another particular exemplary embodiment, the techniques may be realized as a system for identifying malicious downloadable applications comprising one or more processors communicatively coupled to a network, wherein the one or more processors are configured to: receive a signature of a downloadable application, identify a known good application having at least one attribute in common with the downloadable application and having a signature different from the signature of the downloadable application, analyze the downloadable application to evaluate one or more risk factors based at least in part on the at least one common attribute and the difference in signatures, and determine, based on the evaluated one or more risk factors, one or more responsive actions.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
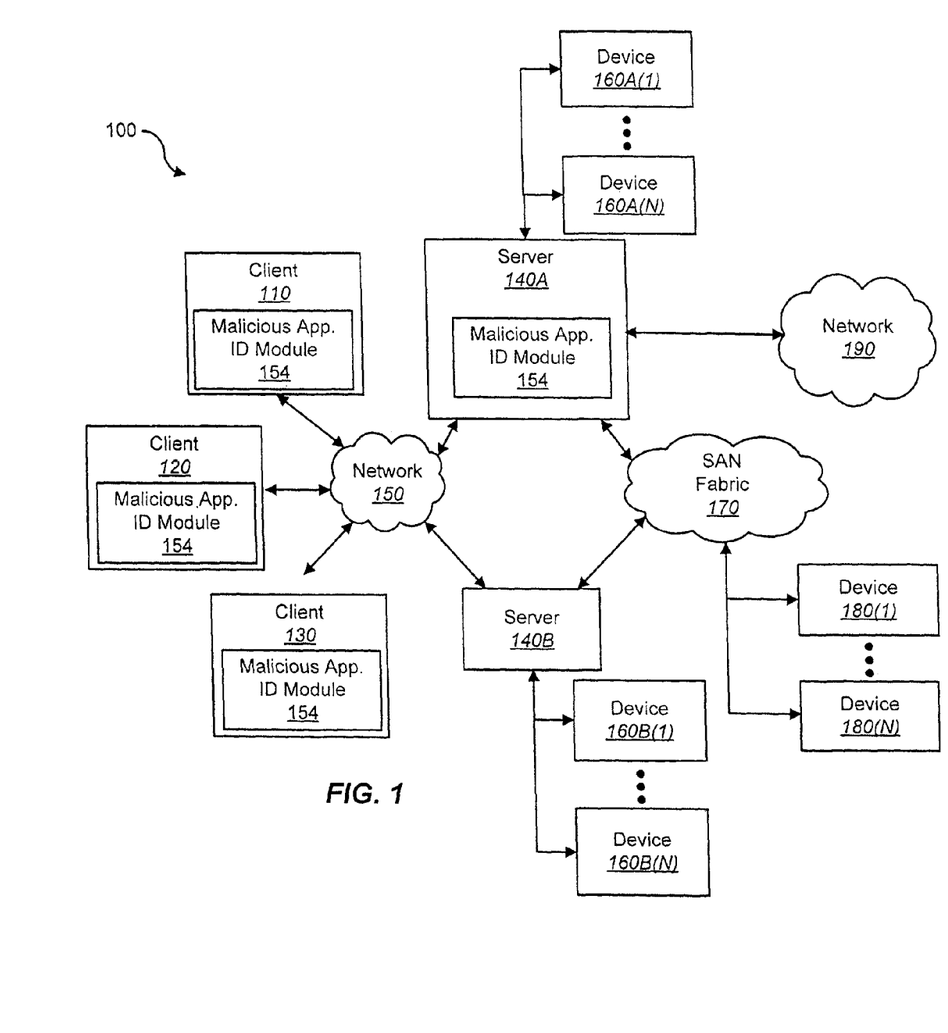
FIG. 1 shows a block diagram depicting a network architecture for identifying malicious downloadable applications, in accordance with an embodiment of the present disclosure.

FIG. 1 shows a block diagram depicting a network architecture 100 for identifying malicious downloadable applications in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. According to some embodiments, client systems 110, 120 and 130 may contain one or more components of malicious application identification module 154. Server 140A may be communicatively coupled to storage devices 160A(1)-(N), and server 140B may be communicatively coupled to storage devices 160B(1)-(N). Servers 140A and 140B may contain a management module (e.g., malicious application identification module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
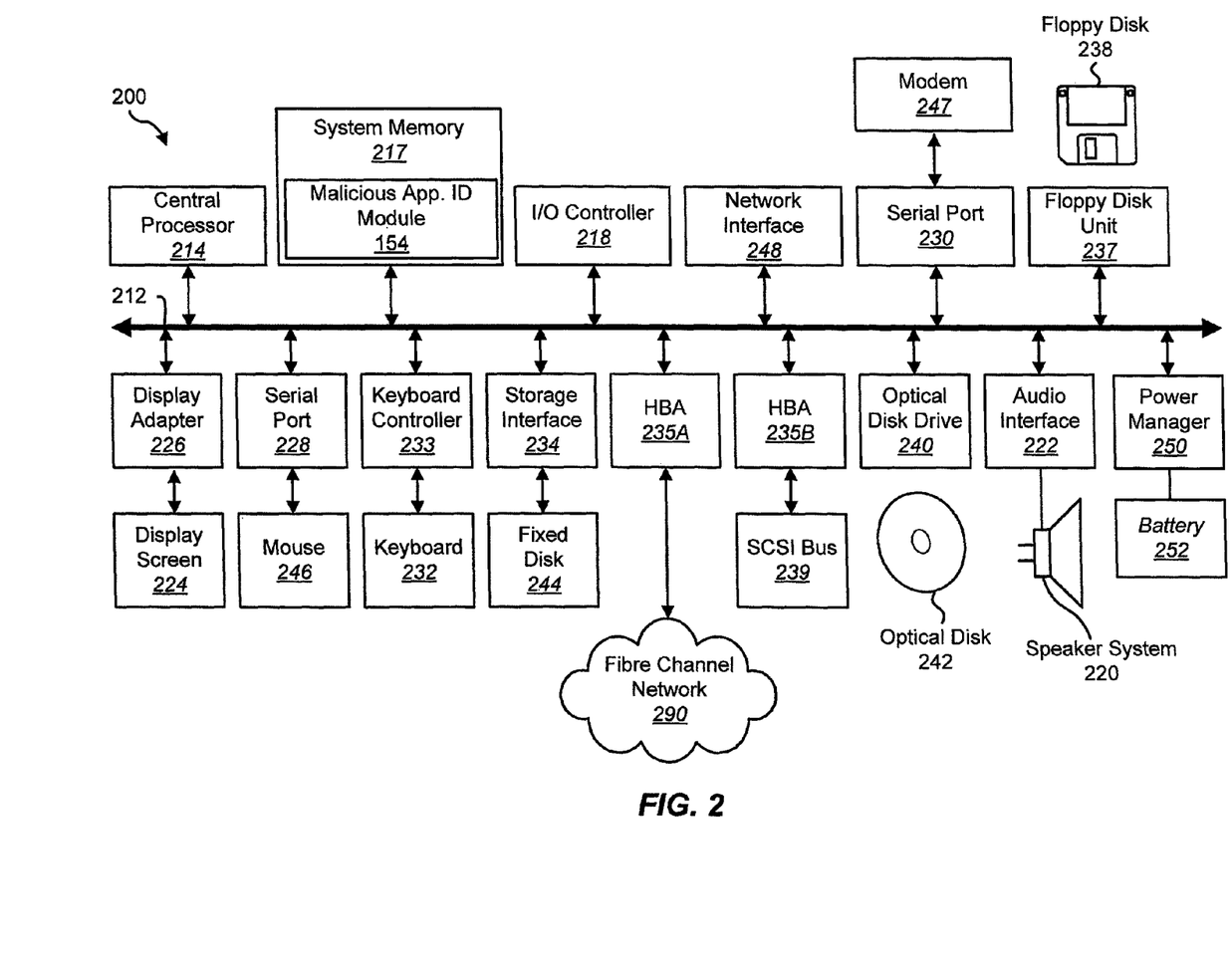
FIG. 2 depicts a block diagram of a computer system, in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for identification of malicious downloadable applications such as, for example, malicious application identification module 154. As illustrated, one or more portions of malicious application identification module 154 may reside at a network centric location. For example, server 140A may be a server, a firewall, a gateway, or other network element that may perform one or more actions to identify a malicious application. According to some embodiments, network 190 may be an external network (e.g., the Internet) and server 140A may be a gateway or firewall between one or more internal components and clients and the external network.

Malicious application identification module 154 may identify malicious downloadable applications such as, for example, a legitimate popular application modified to contain malicious code (i.e., trojanized). Downloadable applications may be Java based applications or other applications which are signed. In addition, the security model of the Android platform has allowed the proliferation of "trojanized" malware versions of otherwise legitimate apps (because legitimate apps may be modified, anonymously signed, and re-posted to app stores). Other platforms, mobile platforms, such as iOS, may also provide opportunities for parasitic infections and trojanized software. According to some embodiments, malicious application identification module 154 may receive and/or obtain digital signatures and/or attributes of known legitimate downloadable applications. For example, an application package may be input into a hash function. The resulting hash code may also be encrypted with a public key associated with an entity (e.g., a software publisher). Application signatures may be obtained from clients and/or members of a code signing service. For example, a software publisher may register with a code signing service and may obtain a digital signature from the code signing service. According to some embodiments, a service provider, a software vendor, or another entity may use a web crawler to obtain signatures of applications from web portals, app stores, and other Internet accessible sites. Application signatures may also be collected by agent software residing on client devices (e.g., smart phones, personal computers, etc.). For example, malicious application identification modules 154 on clients 110, 120, and/or 130 may be agent software collecting application signatures (e.g., upon download of an application, request for an application, etc.).

According to some embodiments, malicious application identification module 154 on server 140A may be a portion of the module collecting signatures and/or attributes from agents, analyzing applications and signatures, and/or collecting signatures and/or attributes from Internet downloadable applications. In one or more embodiments, malicious application identification modules 154 may also receive signatures and/or attributes of known good applications from a third party (e.g., a security service provider or a software vendor) and/or send application data (e.g., signatures) to a third party for analysis. According to some embodiments, malicious application identification module 154 on server 154 may be a gateway which may scan requests for downloadable applications and/or responses to requests for downloadable applications.

According to some embodiments, one or more portions of malicious application identification module 154 may classify applications associated with signatures to identify legitimate applications. Legitimate applications may be determined by a hash code associated with a known good application (e.g., associated with a certificate from a software publisher, vendor, or other entity with a good reputation). Other attributes may be used to classify an application including online ratings, a number of downloads, an earlier publication date, etc.

Malicious application identification module 154 may identify an application with one or more attributes in common with another application but with a different signature. According to some embodiments, a common attribute may be a package name (e.g., a name of an Android Application Package file (APK), a Java Archive (JAR) file name, or another application distribution name). Another common attribute used may be a file name associated with a distribution. If an application distribution contains a different signature but a same application name this may be an indicator of a malicious application. However, it may also be a result of an individual trying to distribute a benign application containing functionality of a vendor. Such a benign application may be less of a concern to an end user, but may be of interest to a software publisher that originally developed the functionality. According to some embodiments, risk factors may be evaluated when an application contains one or more features in common with a second application whose signature differs.

According to some embodiments, malicious application identification module 154 may identify applications whose attributes are close to known good applications, but whose signatures are different. For example, malicious application identification module 154 may use Locality Sensitive Hashing (LSH) or other dimension reduction techniques to find applications with a similar attributes but different signatures from a known good application. According to some embodiments, certain attributes may be used as classifiers. Hash codes of attributes of a known good application may be compared to hash codes of the same attributes of another application in order to find similar applications. Thus, a signature of an entire application file or distribution may differ but significant specific attributes or classifiers may match. Malicious application identification module 154 may contain and/or access storage of known signatures. For example, malicious application identification module 154 may generate a signature of a received application and compare it with signatures of known good applications. Signatures of known good applications may be collected and stored in storage local to or remote from malicious application identification module 154 (e.g., devices 180 of SAN 170 or devices 160). Locality-Sensitive Hashing may find the closest member of a group of known good applications for a given sample. If applications are very close, this may indicate that the file is a parasitic infection or a trojanized version of the known good application, or a new variant of some malware. Malicious application identification module 154 may use a number of different classifiers associated with an application as inputs for locality sensitive hashing. For example, the features that go into classifiers may be based on static features of an application such as, for example, file names, imported resources used by an application, exported resources of an application, contents of a manifest file, and other application metadata. According to some embodiments, comparing static features of the downloadable application with static features of a known good application may include using functional flow graphs of one or more static features and graph isomorphism or other algorithms to determine a percentage of static features common to a downloadable application and a known good application. Malicious application identification module 154 may also use functional flow graphs of one or more static features and graph isomorphism or other algorithms to identify similar applications without first using locality sensitive hashing.

According to some embodiments, malicious application identification module 154 may use locality sensitive hashing to determine closeness of an application to known bad applications. For example, if an attribute of an unknown application matches a known good application (e.g., the package names or file names match) but the signatures of the two applications do not match, locality sensitive hashing may be used to determine if the unknown application has one or more attributes or classifiers similar to known malware. In some embodiments, portions of an unknown application, which are different from a known good application with common attributes, may be analyzed. Such different portions of a similar application may be embedded malware which may match malware embedded in other trojanized applications. For example, a first application may have several similar attributes (e.g., a package name, inputs, exports, a manifest file, etc.) to a known good application, but the signature of the first application may not match the signature of the known good application. The differences between the first application and the known good application may be identified and these differences may be compared against known malware.

Malicious application identification module 154 may use a configurable threshold distance of closeness to determine whether a first application is sufficiently close to a second application to determine that the first application is a variant of the second application. According to some embodiments, a plurality of thresholds may be used and different actions may be performed depending on the threshold.

Malicious application identification module 154 may perform static analysis of features an unknown application which may not require the unknown to run or be emulated. This may avoid risk with running or emulating potential malware and overhead with containing threats from runtime or emulation analysis.

In one or more embodiments, malicious application identification module 154 may be implemented by a security solution provider and/or a software vendor as a service to clients subscribing to a code signing service or other security service clients. Malicious application identification module 154 may monitor for variants of clients applications with signatures different from but attributes similar to client applications. Clients may be notified when variants of their signed applications are detected. According to some embodiments, notification may be done only when functionality is found similar above some threshold, and/or if a percentage of functionality is found similar above some threshold percentage. In addition to detecting potential malware or trojanized variants of legitimate applications, this may detect use of a proprietary functionality of a client by someone else (e.g., a person copying proprietary technology and reselling it).

According to some embodiments, comparison of signatures and functionality of applications with known good applications may be done at a lower priority than traditional malware detection methods. For example, a gateway or endpoint protection system may scan downloads first using traditional malware detection methods to identify downloads matching known malware.

Malicious application identification module 154 may be utilized to scan different application types for different platforms including, for example, cell phones, personal digital assistants, gaming devices, other mobile devices, personal computers, and servers. Legitimate downloadable applications, such as those for mobile devices, may be more likely to be signed which may facilitate analysis. Java applications may also pose a threat because Java applications may be easy for a third party to modify in order to add malicious code. Such mobile applications may be analyzed for malicious code at a higher priority than code for a personal computer platform.

According to some embodiments, once an unknown application has been identified as having at least one attribute in common with a known good application (e.g., a package name) but with a different signature, the application may be evaluated for risk factors. Malicious application identification module 154 may analyze an application to identify functionality associated with risky behavior. For example, functionality associated with risky behavior may include sending SMS messages (e.g., to an address resulting in a charge to the sender or containing personal information from the device), accessing a call log of a device, accessing contacts of a device, gaining root access, and/or installing a backdoor. Malicious application identification module 154 may determine a level of risk based on similarity of an unknown application to a known application, identified risk factors, and/or other techniques (e.g., comparison to known malware, behavioral analysis, etc.).

Malicious application identification module 154 may perform one or more actions in response to a determined risk level. Actions may include, for example, warning a user, blocking a download of a downloadable application, updating protection on a client device, downloading a downloadable application, logging the download of an application, alerting an administrator, and allowing the download of an application. Malicious application identification module 154 may also notify a software publisher or other entity associated with a known good application in response to the detection of a variant of the application.

According to some embodiments, malicious application identification module 154 may also evaluate a plurality of applications with one or more similar attributes to determine which represent legitimate applications. For example, malicious application identification module 154 may identify a legitimate application from among a plurality of applications sharing at least one attribute (e.g., a same package name or similar signatures) based on one or more attributes associated with the legitimate application. For example, a legitimate application may be identified by malicious application identification module 154 by one or more of a known publisher associated with an application, a reputation associated with an application, a release date of an application, a rating of an application, and a number of downloads of an application. If a plurality of downloads are available containing the same package name attributes such as an earlier release date, a greater number of downloads, or a publisher with good reviews may indicate a legitimate application. This legitimate application may be compared against other applications with similar attributes such as, for example, a same package name, inputs, or exports, to identify potential malicious copies of the legitimate application. According to some embodiments, unknown applications may be flagged for further follow up. For example, an unknown application may be sent to a third party (e.g., a security systems vendor or code signing service provider) for analysis and identification.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, malicious application identification module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
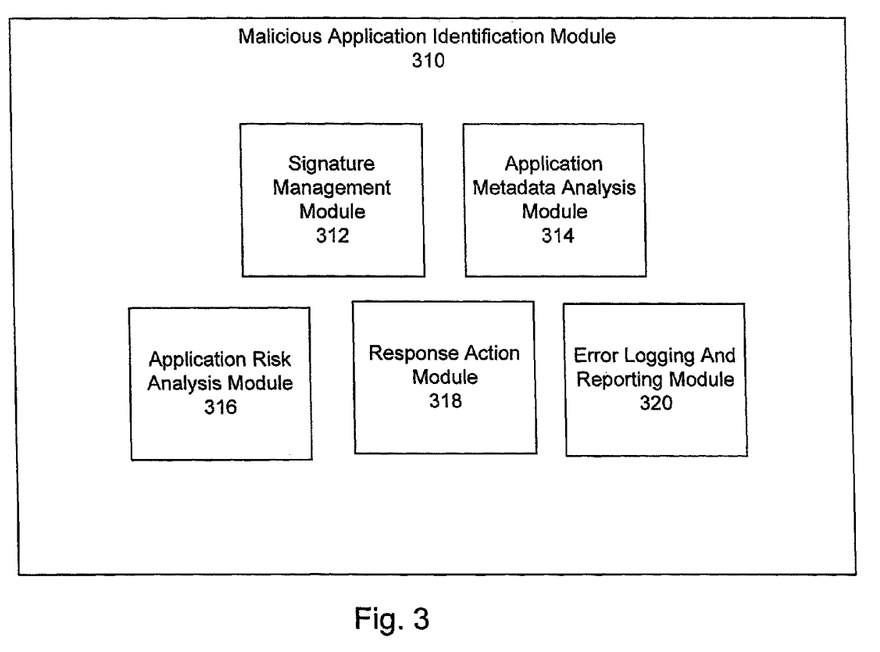
FIG. 3 shows a module for identifying malicious downloadable applications, in accordance with an embodiment of the present disclosure.

Referring to FIG. 3, there is shown a malicious application identification module 310 in accordance with an embodiment of the present disclosure. As illustrated, the malicious application identification module 310 may contain one or more components including signature management module 312, application metadata analysis module 314, application risk analysis module 316, response action module 318, and error logging and reporting module 320.

The description below describes network elements, computers, and/or components of a system and method for identifying malicious downloadable applications that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Signature management module 312 may collect and/or generate signatures of applications and/or attributes of applications. Signature management module 312 may be a portion of a malicious downloadable detection module which collects signatures from agents, analyzes applications and signatures, and/or collects signatures from Internet downloadable applications. In one or more embodiments, signature management module 312 may also receive signatures of known good applications from a third party (e.g., a security service provider or a software vendor) and/or send application data (e.g., signatures) to a third party for analysis. Signature management module 312 may, according to some embodiments, crawl a web portal or other Internet sites to collect application signatures. Signatures may be a single signature for an entire application or distribution, a plurality of signatures for an application or distribution (e.g., signatures of attributes or classifiers), or both.

Signature management module 312 may also compare of attributes between applications. Signature management module 312 may identify applications having one or more attributes close to known good applications. For example, signature management module 312 may use Locality Sensitive Hashing (LSH) or other dimension reduction techniques to find applications with similar attributes (or classifiers), but a different signature from a known good application. Signature management module 312 may contain and/or access storage of known signatures (e.g., hash codes of entire applications or distributions, and hash codes of attributes or classifiers of an application or distribution). Locality-Sensitive Hashing may find the closest member of a group of known good applications for a given sample. If attributes of the applications are within a specified range, this may indicate that the application is a parasitic infection or a trojanized version of a known good application, or a new variant of some malware. Signature management module 312 may use a number of different classifiers associated with an application as inputs for locality sensitive hashing. For example, the features that go into classifiers may be based on static features of an application such as, for example, file names, imported resources used by an application, exported resources of an application, contents of a manifest file, and other application metadata. According to some embodiments, comparing static features of the downloadable application with static features of a known good application may include using functional flow graphs of one or more static features and graph isomorphism or other algorithms to determine a percentage of static features common to a downloadable application and a known good application. Signature management module 312 may also use functional flow graphs of one or more static features and graph isomorphism or other algorithms to identify similar applications without first using locality sensitive hashing.

Application metadata analysis module 314 may evaluate a plurality of applications with one or more similar attributes to determine which represent legitimate applications. For example, Application metadata analysis module 314 may identify a legitimate application from among a plurality of applications sharing at least one attribute (e.g., a same package name or similar signatures) based on one or more attributes associated with the legitimate application. For example, a legitimate application may be identified by application metadata analysis module 314 by a known publisher associated with an application, a reputation associated with an application, a release date of an application, a rating of an application, and/or a number of downloads of an application. If a plurality of downloads are available containing the same package name attributes such as an earlier release date, a greater number of downloads, or a publisher with good reviews may indicate a legitimate application. This legitimate application may be compared against other applications with similar attributes such as, for example, a same package name or a similar signature, to identify potential malicious copies of the legitimate application. According to some embodiments, unknown applications may be flagged for further follow up. For example, an unknown application may be sent to a third party (e.g., a security systems vendor) for analysis and identification.

Application risk analysis module 316 may evaluate applications to identify a level of risk associated with an application. For example, application risk analysis module 316 may analyze an application to identify functionality associated with risky behavior. Functionality associated with risky behavior may include sending SMS messages (e.g., to an address resulting in a charge to the sender or containing information from personal information from the device), accessing a call log of a device, accessing contacts of a device, gaining root access, and/or installing a backdoor. Application risk analysis module 316 may determine a level of risk based on similarity of an unknown application to a known application, identified risk factors, and/or other techniques (e.g., comparison to known malware, behavioral analysis, etc.).

Response action module 318 may perform one or more actions in response to a determined risk level. Actions may include, for example, warning a user, blocking a download of a downloadable application, updating protection on a client device, downloading a downloadable application, logging the download of an application, alerting an administrator, and allowing the download of an application. Response action module 318 may also notify a software publisher or other entity associated with a known good application in response to the detection of a variant of the application.

Error logging and reporting module 320 may produce logs, reports, or other information associated with identifying malicious downloadable applications.

Figure 4:
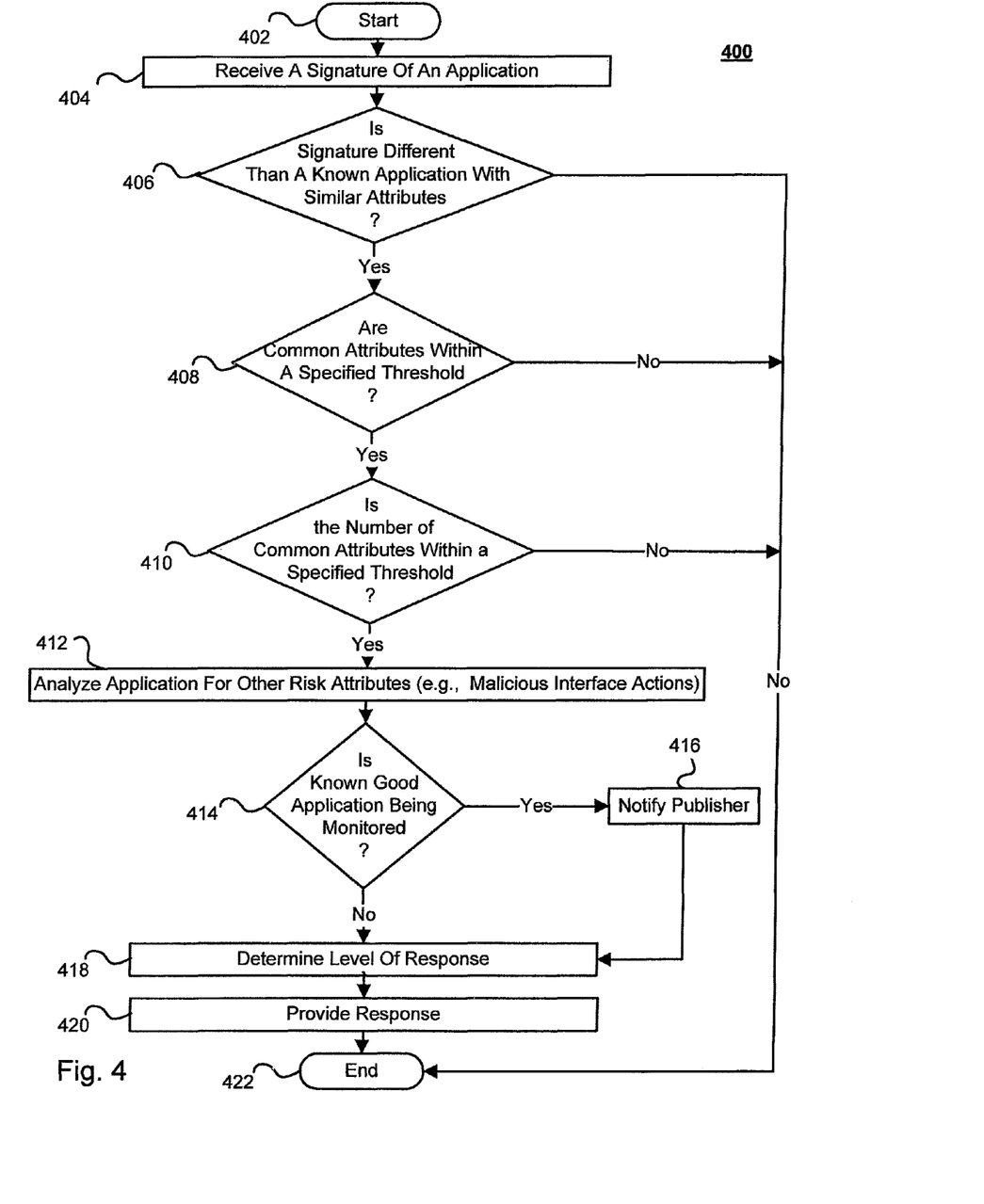
FIG. 4 depicts a method for identifying malicious downloadable applications, in accordance with an embodiment of the present disclosure.

Referring to FIG. 4, there is depicted a method 400 for identifying malicious downloadable applications in accordance with an embodiment of the present disclosure. At block 402, the method 400 may begin.

At block 404, a signature of an application may be received or generated.

At block 406, a received signature may be compared with a plurality of signatures of known applications to identify applications having attributes that are similar but different signatures. Signatures that are different in applications having matching attributes may indicate applications that are copies of an original application, but with modifications. According to some embodiments, locality Sensitive Hashing (LSH) or other dimension reduction techniques to find applications with a similar but different attributes from a known good application. Locality-Sensitive Hashing may find the closest member of a group of known good applications for a given sample. A number of different classifiers associated with an application may be used as inputs for locality sensitive hashing. For example, the features that go into classifiers may be based on static features of an application such as, for example, file names, imported resources used by an application, exported resources of an application, contents of a manifest file, and other application metadata. According to some embodiments, comparing static features of the downloadable application with static features of a known good application may include using functional flow graphs of one or more static features and graph isomorphism or other algorithms to determine a percentage of static features common to a downloadable application and a known good application. Functional flow graphs of one or more static features and graph isomorphism or other algorithms may also be used to identify similar applications without first using locality sensitive hashing. If a signature is not different from a known application with similar attributes, the method 400 may end at block 422. If a signature is different from a known application with similar attributes, the method 400 may continue at block 408.

At block 408, it may be determined whether identified common attributes are close enough within a specified threshold (e.g., are common imported resources used by two applications close enough). If common attributes are not close enough, the method 400 may end at block 422. If common attributes are close enough, the method 400 may continue at block 410.

At block 410, it may be determined whether the number of identified common attributes is within a specified threshold (e.g., have more than a specified minimum number of attributes been identified as being shared by the known and unknown applications). If the number common attributes does not meet a minimum threshold, the method 400 may end at block 422. If number of common attributes meets the minimum threshold, the method 400 may continue at block 412.

At block 412, an application may be further analyzed to identify additional risk attributes. For example, an application may be analyzed to identify functionality associated with risky behavior. Functionality associated with risky behavior may include sending SMS messages (e.g., to an address resulting in a charge to the sender or containing information from personal information from the device), accessing a call log of a device, accessing contacts of a device, gaining root access, and/or installing a backdoor. A level of risk may be determined based on similarity of an unknown application to a known application, identified risk factors, and/or other techniques (e.g., comparison to known malware, behavioral analysis, etc.).

At block 414, it may be determined whether an application is being monitored. For example, a known good application may be associated with a client of a code signing service. If a variant of the application is identified one or more actions may be performed depending on a level of similarity between the known good application and the variant. If a variant is detected for a monitored application, the method 400 may continue at block 416. If the application is not being monitored, the method 400 may continue at block 418.

At block 416, an entity associated with a known application may be notified. For example, a client of a code signing service may be notified that a variant has been detected. A notification may depend on a level of similarity, a number of similar features, a client preference, an administrator preference, a risk level of a detected variant, a type of known good application, and/or other factors. Notification may be via email, SMS, a web posting, voicemail, or other electronic methods. Notification may also be provided to an administrator of an entity providing a code signing service and the administrator or other personnel may contact a publisher of the known good application.

At block 418, a level of response may be determined based on a number of common attributes between a known and unknown application, a level of commonality between those attributes, other risk factors, administrator preferences, software publisher preferences (e.g., for clients of a code signing service), end user preferences (e.g., a mobile device user with a malicious downloadable detection system installed), a similarity between an unknown application and malware, and other factors.

At block 420, one or more actions may be performed in response to a determined risk level. Actions may include, for example, warning a user, blocking a download of a downloadable application, updating protection on a client device, downloading a downloadable application, logging the download of an application, alerting an administrator, and allowing the download of an application.

At block 422, the method 400 may end.

Figure 5:
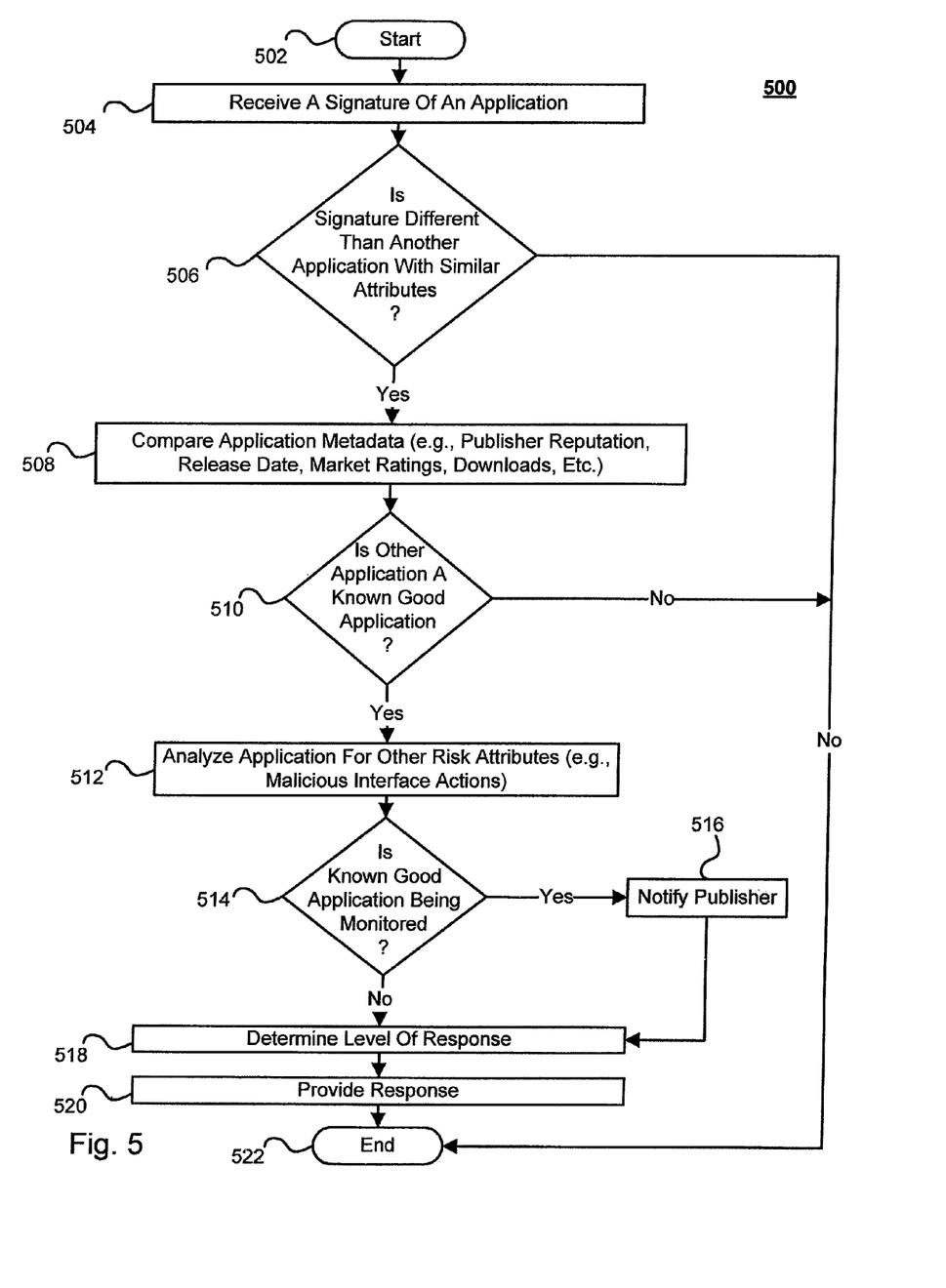
FIG. 5 depicts a method for identifying malicious downloadable applications, in accordance with an embodiment of the present disclosure.

Referring to FIG. 5, there is depicted a method 500 for identifying malicious downloadable applications in accordance with an embodiment of the present disclosure. At block 502, the method 500 may begin.

At block 504, a signature of an application may be received or generated.

At block 506, a signature of a first application may be compared against signatures of one or more second applications with similar attributes. For example, it may be determined if the package names or file names match between two applications but the signatures of the two applications do not match. If the received signature for a first application does not match a signature of a second application which has similar attributes, the method 500 may continue at block 508. If the signature does match or the attributes of the first application are not similar to another application, the method 500 may end at block 522.

At block 508, the application for which the signature was received (i.e., the application under evaluation) and one or more second identified applications with common features and different signatures may be analyzed to determine which represent legitimate applications. For example, a legitimate application may be identified from among a plurality of applications sharing at least one attribute (e.g., a same package name or similar signatures) based on one or more attributes associated with the legitimate application. For example, a legitimate application may be identified by one or more of a known publisher associated with an application, a reputation associated with an application, a release date of an application, a rating of an application, and a number of downloads of an application. If a plurality of downloads are available containing the same package name attributes such as an earlier release date, a greater number of downloads, or a publisher with good reviews may indicate a legitimate application. This legitimate application may be compared against other applications with similar attributes such as, for example, a same package name or a similar signature, to identify potential malicious copies of the legitimate application. According to some embodiments, unknown applications may be flagged for further follow up. For example, an unknown application may be sent to a third party (e.g., a security systems vendor or code signing service provider) for analysis and identification.

At block 510, if the other known applications are identified as good applications, the method 500 may continue at block 512. If the other known applications are not identified, the method may end at block 522. Other actions may be performed including traditional malware analysis on the application under evaluation and/or the other known applications. Manual classification and/or escalation to a system administrator may be performed.

At block 512, an application may be further analyzed to identify additional risk attributes. For example, an application may be analyzed to identify functionality associated with risky behavior. Functionality associated with risky behavior may include sending SMS messages (e.g., to an address resulting in a charge to the sender or containing information from personal information from the device), accessing a call log of a device, accessing contacts of a device, gaining root access, and/or installing a backdoor. A level of risk may be determined based on similarity of an unknown application to a known application, identified risk factors, and/or other techniques (e.g., comparison to known malware, behavioral analysis, etc.).

At block 514, it may be determined whether an application is being monitored. For example, a known good application may be associated with a client of a code signing service. If a variant of the application is identified one or more actions may be performed depending on a level of similarity between the known good application and the variant. If a variant is detected for a monitored application, the method 500 may continue at block 516. If the application is not being monitored, the method 500 may continue at block 518.

At block 516, an entity associated with a known application may be notified. For example, a client of a code signing service may be notified that a variant has been detected. A notification may depend on a level of similarity, a number of similar features, a client preference, an administrator preference, a risk level of a detected variant, a type of known good application, and/or other factors. Notification may be via email, SMS, a web posting, voicemail, or other electronic methods. Notification may also be provided to an administrator of an entity providing a code signing service and the administrator or other personnel may contact a publisher of the known good application.

At block 518, a level of response may be determined based on a number of common attributes between a known and unknown application, a level of commonality between those attributes, other risk factors, administrator preferences, software publisher preferences (e.g., for clients of a code signing service), end user preferences (e.g., a mobile device user with a malicious downloadable detection system installed), a similarity between an unknown application and malware, and other factors.

At block 520, one or more actions may be performed in response to a determined risk level. Actions may include, for example, warning a user, blocking a download of a downloadable application, updating protection on a client device, downloading a downloadable application, logging the download of an application, alerting an administrator, and allowing the download of an application.

At block 522, the method 500 may end.

At this point it should be noted that identifying malicious downloadable applications in accordance with the present disclosure as described above typically involves the processing of input data and the generation of output data to some extent. This input data processing and output data generation may be implemented in hardware or software. For example, specific electronic components may be employed in a malicious downloadable applications identification module or similar or related circuitry for implementing the functions associated with identifying malicious downloadable applications in accordance with the present disclosure as described above. Alternatively, one or more processors operating in accordance with instructions may implement the functions associated with identifying malicious downloadable applications in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for identifying malicious downloadable applications comprising:
   receiving a signature of a downloadable application;
   identifying, using a malicious application identification device, a known good application having at least one attribute in common with the downloadable application and having a signature different from the signature of the downloadable application;
   determining, using the malicious application identification device, that a percentage of static features common to both the downloadable application and the known good application exceeds a specified threshold based on a comparison of static features of the downloadable application with static features of the known good application, wherein identification of different signatures between the downloadable application and the known good application and the determination that the percentage of static features common to both the downloadable application and the known good application exceeds the specified threshold provide an indication of malware;
   analyzing, in response to the determination that the percentage of static features common to the downloadable application and the known good application exceeds the specified threshold, the downloadable application to evaluate one or more risk factors based at least in part on the at least one common attribute and the difference in signatures;
   determining if the known good application is being monitored; and
   determining, based on the evaluated one or more risk factors, one or more responsive actions.

2. The method of claim 1, wherein the at least one common attribute comprises a common package name.

3. The method of claim 1, where the static features comprise at least one of: class names, imported resources, exported resources, file names, and file sizes.

4. The method of claim 1, wherein comparing static features of the downloadable application with static features of the known good application is performed using locality sensitive hashing.

5. The method of claim 1, wherein comparing static features of the downloadable application with static features of the known good application further comprises using functional flow graphs of the static features to determine a percentage of static features common to the downloadable application and the known good application.

6. The method of claim 1, wherein a known good application comprises an application registered with a code signing service.

7. The method of claim 1, further comprising identifying a known good application based on at least one of: a known publisher associated with an application, a reputation associated with an application, a release date of an application, a rating of an application, and a number of downloads of an application.

8. The method of claim 1, wherein analyzing the downloadable application to evaluate one or more risk factors comprises analyzing the downloadable application to identify functionality associated with malicious behavior.

9. The method of claim 8, wherein functionality associated with risky behavior includes at least one of: sending SMS messages, accessing a call log, accessing contacts, gaining root access, and installing a backdoor.

10. The method of claim 1, wherein determining one or more responsive actions comprises:
  determining a level of risk based at least in part on a percentage of static features common to the downloadable application and the known good application and the one or more risk factors; and
  identifying the one or more responsive actions corresponding to the determined level of risk.

11. The method of claim 1, further comprising performing one or more responsive actions.

12. The method of claim 11, wherein the one or more responsive actions comprises notifying a publisher associated with the known good application.

13. The method of claim 11, wherein the one or more responsive actions comprise at least one of: warning a user; blocking a download of the downloadable application; updating protection on a client device downloading the downloadable application; logging the download; alerting an administrator; and allowing the download.

14. The method of claim 1, wherein receiving a signature comprises crawling a website to collect one or more signatures of downloadable applications; receiving a signature from an agent on client device; and receiving a signature from a user of a code signing service.

15. The method of claim 1, wherein one or more portions of identifying malicious downloadable applications is performed using at least one of: a client device based security application; a firewall; a gateway; and a network based security application.

16. The method of claim 1, wherein downloadable applications for a mobile platform are analyzed at a higher priority than downloadable applications for personal computers.

17. The method of claim 1, wherein the signature received comprises a plurality of signatures for a distribution of a known good application.

18. An article of manufacture for identifying malicious downloadable applications, the article of manufacture comprising:
  at least one non-transitory processor readable storage medium; and
  instructions stored on the at least one medium;
  wherein the instructions are configured to be readable from the at least one medium by at least one processor and thereby cause the at least one processor to operate so as to:
    receive a signature of a downloadable application;
    identify a known good application having at least one attribute in common with the downloadable application and having a signature different from the signature of the downloadable application;
    determine that a percentage of static features common to the downloadable application and the known good application exceeds a specified threshold based on a comparison of static features of the downloadable application with static features of the known good application, wherein identification of different signatures between the downloadable application and the known good application and the determination that the percentage of static features common to the downloadable application and the known good application exceeds the specified threshold provide an indication of malware;
    analyze, in response to the determination that the percentage of static features common to the downloadable application and the known good application exceeds the specified threshold, the downloadable application to evaluate one or more risk factors based at least in part on the at least one common attribute and the difference in signatures;
    determine if the known good application is being monitored; and
    determine, based on the evaluated one or more risk factors, one or more responsive actions.

19. A system for identifying malicious downloadable applications comprising:
  at least one memory device;
  one or more computer processors communicatively coupled to a network and the at least one memory device; wherein the one or more computer processors are configured to:
    receive a signature of a downloadable application;
    identify a known good application having at least one attribute in common with the downloadable application and having a signature different from the signature of the downloadable application;
    determine that a percentage of static features common to the downloadable application and the known good application exceeds a specified threshold based on a comparison of static features of the downloadable application with static features of the known good application, wherein identification of different signatures between the downloadable application and the known good application and the determination that the percentage of static features common to the downloadable application and the known good application exceeds the specified threshold provide an indication of malware;
    analyze, in response to the determination that the percentage of static features common to the downloadable application and the known good application exceeds the specified threshold, the downloadable application to evaluate one or more risk factors based at least in part on the at least one common attribute and the difference in signatures;
    determine if the known good application is being monitored; and
    determine, based on the evaluated one or more risk factors, one or more responsive actions.

* * * * *